United States Patent
Heyd et al.

(10) Patent No.: US 11,455,039 B2
(45) Date of Patent: Sep. 27, 2022

(54) ADVANCED HAPTICS IN TOUCHSCREEN AVIONICS LOWER LEVEL DEVICE SIMULATORS

(71) Applicant: Rockwell Collins, Inc., Cedar Rapids, IA (US)

(72) Inventors: Paul Heyd, Marion, IA (US); Paul Langholz, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/024,247

(22) Filed: Sep. 17, 2020

(65) Prior Publication Data
US 2022/0083139 A1    Mar. 17, 2022

(51) Int. Cl.
| | |
|---|---|
| G06F 3/048 | (2013.01) |
| G06F 3/01 | (2006.01) |
| G06F 3/041 | (2006.01) |
| G06F 3/04817 | (2022.01) |
| G06F 3/0488 | (2022.01) |
| G06F 3/14 | (2006.01) |

(Continued)

(52) U.S. Cl.
CPC ............ *G06F 3/016* (2013.01); *G06F 3/041* (2013.01); *G06F 3/0488* (2013.01); *G06F 3/04817* (2013.01); *G06F 3/1423* (2013.01); *G09B 9/165* (2013.01); *G09B 9/301* (2013.01)

(58) Field of Classification Search
CPC ......... G06F 3/167; G06F 3/017; H04L 67/42; B64C 39/024; B64C 2201/146
See application file for complete search history.

(56) References Cited

U.S. PATENT DOCUMENTS 9,616,993 B1 *  4/2017  Shapiro ............... G08G 5/0052
9,703,476 B1 *  7/2017  Pappas ................ G06F 3/04847
(Continued)

FOREIGN PATENT DOCUMENTS

| CN | 107221223 B | 4/2020 |
|---|---|---|
| EP | 3547287 A1 | 10/2019 |
| EP | 2624238 B1 | 4/2020 |

OTHER PUBLICATIONS

Catelani et al., Haptic Touchscreen Display for Avionics: demonstrator characterization measurements, 2015, IEEE, 5 pages.*

(Continued)

*Primary Examiner* — Linh K Pham
(74) *Attorney, Agent, or Firm* — Suiter Swantz pc llo

(57) ABSTRACT

An avionics lower level device (LLD) simulator may include at least one touchscreen display device. The at least one touchscreen display device may include a display stack assembly including at least one touchscreen sensor and a display and at least one advanced haptic feedback component positioned proximate to the display stack assembly. The at least one touchscreen display device may be configured to display at least one GUI or GUI icon, the at least one GUI or GUI icon related to an operation of an aircraft, may be configured to provide at least one advanced haptic feedback response following an interaction with the at least one GUI or GUI icon displayed on the at least one touchscreen display device, and may be configured to mimic a physical response observed following an operation of a mechanical component installed within a cockpit of the aircraft.

10 Claims, 11 Drawing Sheets

(51) Int. Cl.
*G09B 9/16* (2006.01)
*G09B 9/30* (2006.01)

(56) References Cited

U.S. PATENT DOCUMENTS

| | | | | |
|---|---|---|---|---|
| 10,168,782 | B1* | 1/2019 | Tchon | G10K 11/34 |
| 10,379,616 | B2 | 8/2019 | Peshkin et al. | |
| 10,423,228 | B2 | 9/2019 | Cherif et al. | |
| 2010/0156809 | A1* | 6/2010 | Nutaro | G06F 3/0488 |
| | | | | 340/407.1 |
| 2013/0261851 | A1 | 10/2013 | Komer et al. | |
| 2014/0320436 | A1* | 10/2014 | Modarres | G06F 1/163 |
| | | | | 345/173 |
| 2016/0011685 | A1* | 1/2016 | Suddreth | G06F 3/0393 |
| | | | | 345/173 |
| 2016/0124548 | A1 | 5/2016 | Cherif et al. | |
| 2016/0179327 | A1* | 6/2016 | Zammit-Mangion | |
| | | | | G08G 5/0039 |
| | | | | 701/7 |
| 2016/0328065 | A1 | 11/2016 | Johnson et al. | |
| 2017/0075442 | A1* | 3/2017 | Thomas | G06F 3/041 |
| 2017/0200386 | A1* | 7/2017 | Smith | G06F 3/147 |
| 2018/0009532 | A1* | 1/2018 | Cazals | B64D 11/0689 |
| 2019/0138153 | A1 | 5/2019 | Olley et al. | |
| 2019/0355272 | A1 | 11/2019 | Nusbaum et al. | |
| 2020/0184725 | A1* | 6/2020 | Venugopalan | B64D 43/00 |

OTHER PUBLICATIONS

Catelani'2014 et al., A New Haptic Technology touchscreen: Development, characterization and reliability aspects, 2014. IEEE, 5 pages.*
Girdler et al., Mid-Air Haptics in Aviation—creating the sensation of touch where there is nothing but thin air, 2020, ARXIV.gov, 13 pages.*
Watkins et al., Mid-Air Haptics in Aviation—creating the sensation of touch where there is nothing but thin air, 2018 , IEEE, 10 pages.*
HAP2U, Touch-Display Mobile Technology Wins CES Innovation Award, hap2u.net, Printed Sep. 17, 2020, https://www.hap2u.net/touch-display-mobile-technology-wins-ces-innovation-award/, hap2U, France.
ECA Group: "Flight & Maintenance Training Simulation", Youtube Jun. 19, 2017 (Jun. 19, 2017), XP055891425, Retrieved from the Internet: URL:https://www.youtube.com/watch?v=VK7d0E NBZL8 &t=43s [retrieved on Feb. 9, 2022].
Extended Search Report in European Application No. 21197555.2 dated Feb. 21, 2022.

* cited by examiner

ADVANCED HAPTICS IN TOUCHSCREEN AVIONICS LOWER LEVEL DEVICE SIMULATORS

BACKGROUND

Companies may use simulators to assist a user to train in the operation of commercial or military transportation vehicles such as aircraft. The simulators may be classified as providing different levels of simulation. Where cost and/or space is an issue, the simulators may be lower level devices configured to provide only basic training such as familiarization training or procedure training.

SUMMARY

An avionics lower level device (LLD) simulator is disclosed, in accordance with one or more embodiments of the disclosure. The avionics LLD simulator may include at least one touchscreen display device. The at least one touchscreen display device may include a display stack assembly including at least one touchscreen sensor and a display. The at least one touchscreen display device may include at least one advanced haptic feedback component positioned proximate to the display stack assembly. The at least one touchscreen display device may be configured to display at least one GUI or GUI icon, the at least one GUI or GUI icon related to an operation of an aircraft. The at least one advanced haptic feedback component may be configured to provide at least one advanced haptic feedback response following an interaction with the at least one GUI or GUI icon displayed on the at least one touchscreen display device. The at least one advanced haptic feedback response may be configured to mimic a physical response observed following an operation of a mechanical component installed within a cockpit of the aircraft.

In some embodiments, the at least one advanced haptic feedback component may be positioned underneath the display stack assembly.

In some embodiments, the at least one advanced haptic feedback component may be positioned between a display bezel of the at least one touchscreen display device and the display stack assembly.

In some embodiments, the at least one touchscreen display device may further include at least one force sensor positioned proximate to the at least one advanced haptic feedback component.

In some embodiments, the at least one force sensor may be positioned underneath the display stack assembly.

In some embodiments, the at least one force sensor may be positioned between a display bezel of the at least one touchscreen display device and the display stack assembly.

In some embodiments, the at least one touchscreen display device may further include one or more of a backlight, a support structure, or a support plate. The display stack assembly may be positioned proximate to the one or more of the backlight, the support structure, or the support plate.

In some embodiments, the at least one touchscreen display device may include an instrument panel touchscreen display device configured to display at least one GUI or GUI icon representing an aircraft instrument.

In some embodiments, the at least one touchscreen display device may include a windshield touchscreen display device configured to display at least one GUI or GUI icon representing an actual or emulated environmental condition.

In some embodiments, the at least one touchscreen display device may include a primary flight control touchscreen display device configured to display at least one GUI or GUI icon representing a primary flight control.

In some embodiments, the at least one touchscreen display device may include a secondary control touchscreen display device configured to display at least one GUI or GUI icon representing a secondary aircraft control In some embodiments, the at least one touchscreen display device may include a side console touchscreen display device configured to display at least one GUI or GUI icon representing a side console aircraft control.

In some embodiments, the mechanical component including a button, knob, switch, or lever installed in the cockpit of the aircraft.

An avionics lower level device (LLD) simulator is disclosed, in accordance with one or more embodiments of the disclosure. The avionics LLD simulator may include at least one cockpit section. The avionics LLD simulator may include at least one touchscreen display device coupled to the at least one cockpit section. The at least one touchscreen display device may include a display stack assembly including at least one touchscreen sensor and a display. The at least one touchscreen display device may include at least one advanced haptic feedback component positioned proximate to the display stack assembly. The at least one touchscreen display device may be configured to display at least one GUI or GUI icon, the at least one GUI or GUI icon related to an operation of an aircraft. The at least one advanced haptic feedback component may be configured to provide at least one advanced haptic feedback response following an interaction with the at least one GUI or GUI icon displayed on the at least one touchscreen display device. The at least one advanced haptic feedback response may be configured to mimic a physical response observed following an operation of a mechanical component installed within a cockpit of the aircraft.

In some embodiments, the at least one cockpit section may include at least one of a main chassis, an upper chassis, a center console, an overhead chassis, or a side console.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
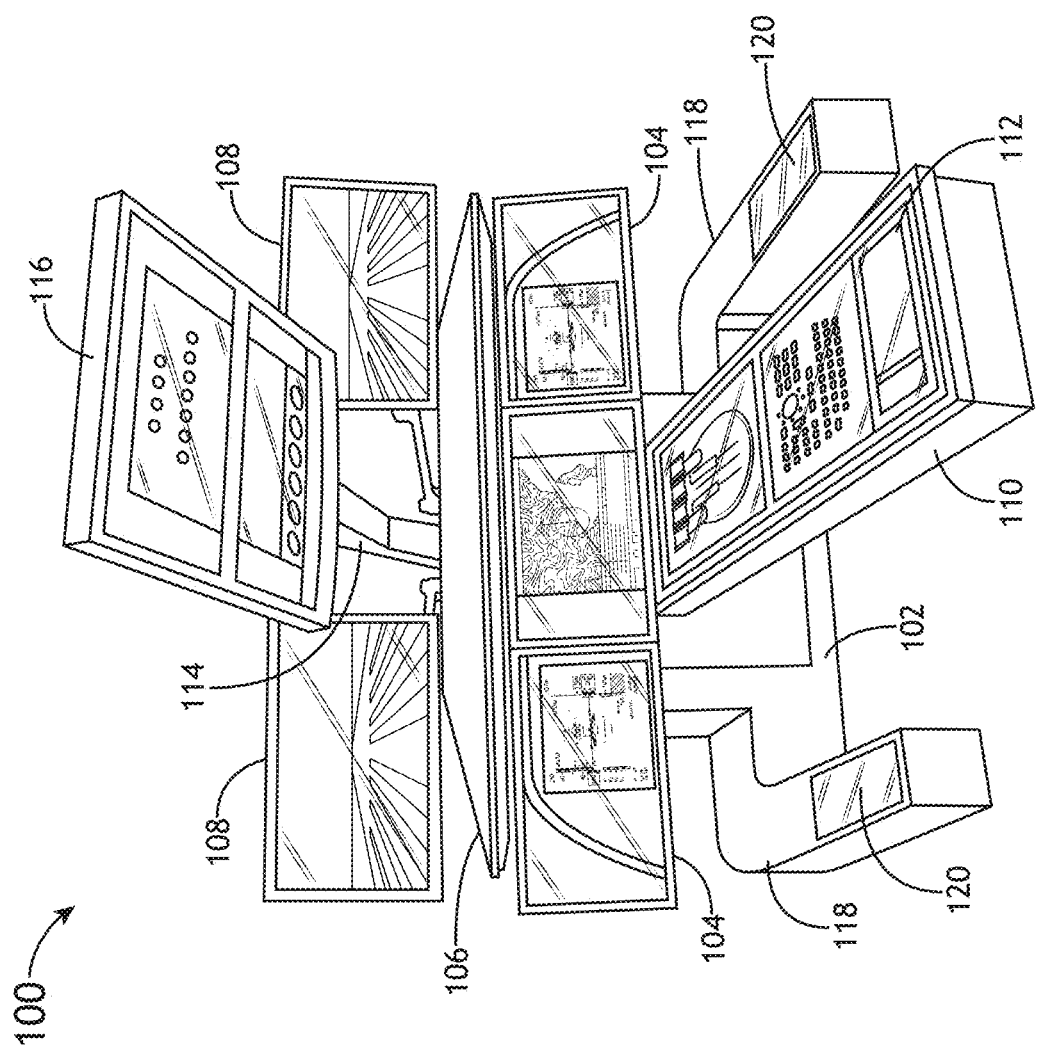
FIG. 1A illustrates an avionics lower level device simulator including advanced haptics in a touchscreen, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

FIGS. 1-5 generally illustrate advanced haptics in touchscreen avionics lower level device simulators, in accordance with one or more embodiments of the disclosure.

Companies may use simulators to assist a user to train in the operation of commercial or military transportation vehicles such as aircraft. The simulators may be classified as providing different levels of simulation. For example, a full-flight or high-level simulator may include entire cockpit assemblies including, but not limited to, panels including toggles (e.g., buttons, knobs, switches, levers, or the like), seats, and other components installed within a cockpit.

Where cost and/or space is an issue, the simulators may be lower level devices (LLD) configured to provide only basic training such as familiarization training or procedure training. For example, the LLD may include, but are not limited to, part-cockpit or part-task trainers. By way of another example, the LLD may include, but are not limited to, a desktop computer build.

For purposes of saving cost and/or space, the LLD may not include dedicated panels and/or mechanical components corresponding to actual components of a cockpit that are within a full-flight or high-level simulator. Instead, the LLD may include off-the-shelf touchscreen display devices. In addition, the LLD may include components of the desktop computer build including, but not limited to, monitors, a keyboard, and/or a mouse. Neither the off-the-shelf touchscreen display device or the components of the desktop computer build, however, may provide the tactile feedback that comes with training with the dedicated panels and/or mechanical components corresponding to actual components of a cockpit that are within a full-flight or high-level simulator.

It is noted herein the tactile feedback may allow a user to understand they have successfully interacted with the simulator. This may be especially important in simulations directed to select stages of flight or environments. For example, simulations of select stages of flight may allow a user the time to visually confirm a selection having been made on the touchscreen display device following the interaction with the touchscreen display device by the user. However, other simulations of more time-constrained scenarios (e.g., during a maneuver, during an emergency, or other stages of flight) may not provide the user with adequate time to visually confirm the selection, instead having to rely on touch.

It is noted that select touchscreen display devices may include basic haptic feedback. Although these select touchscreen display devices may be configured for haptic feedback, ambient and/or environment vibration may give an incorrect indication about whether a user has successfully interacted with the touchscreen display device.

As such, it would be beneficial to provide advanced haptics in touchscreen avionics lower level device simulators. The advanced haptics should mimic a physical response observed following an operation of the mechanical components in full-flight or high-level simulators which, in turn, may mimic a physical response observed following an operation of the mechanical components of installed in a cockpit of the aircraft.

Figure 1B:
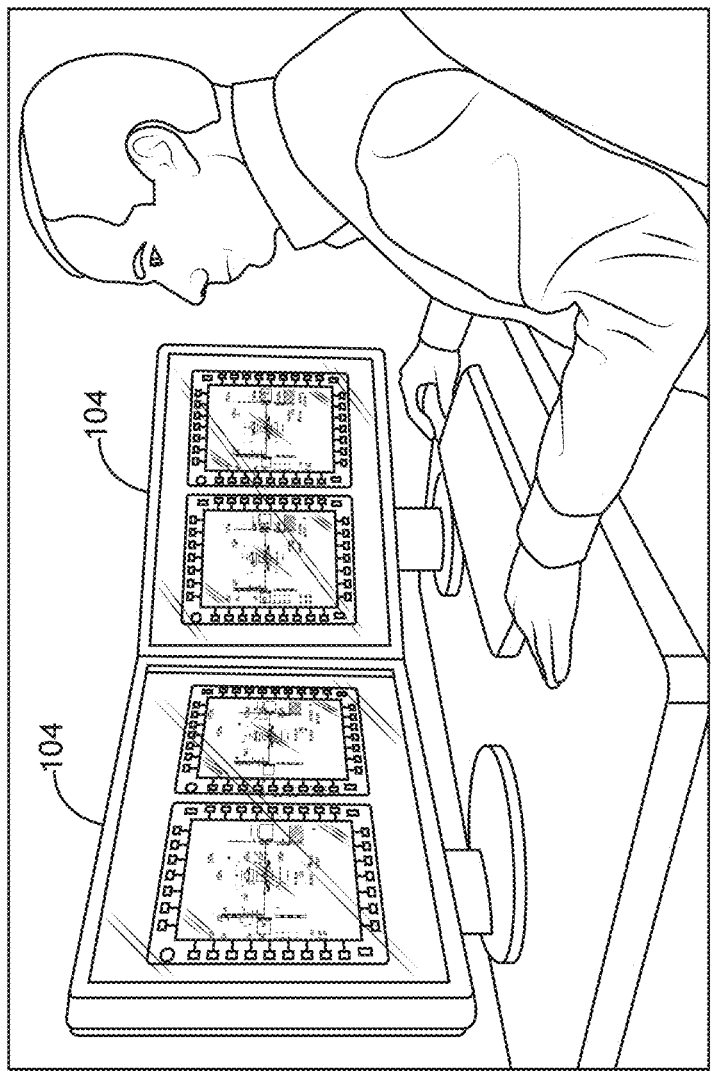
FIG. 1B illustrates an avionics lower level device simulator including advanced haptics in a touchscreen, in accordance with one or more embodiments of the disclosure.
Figure 1C:
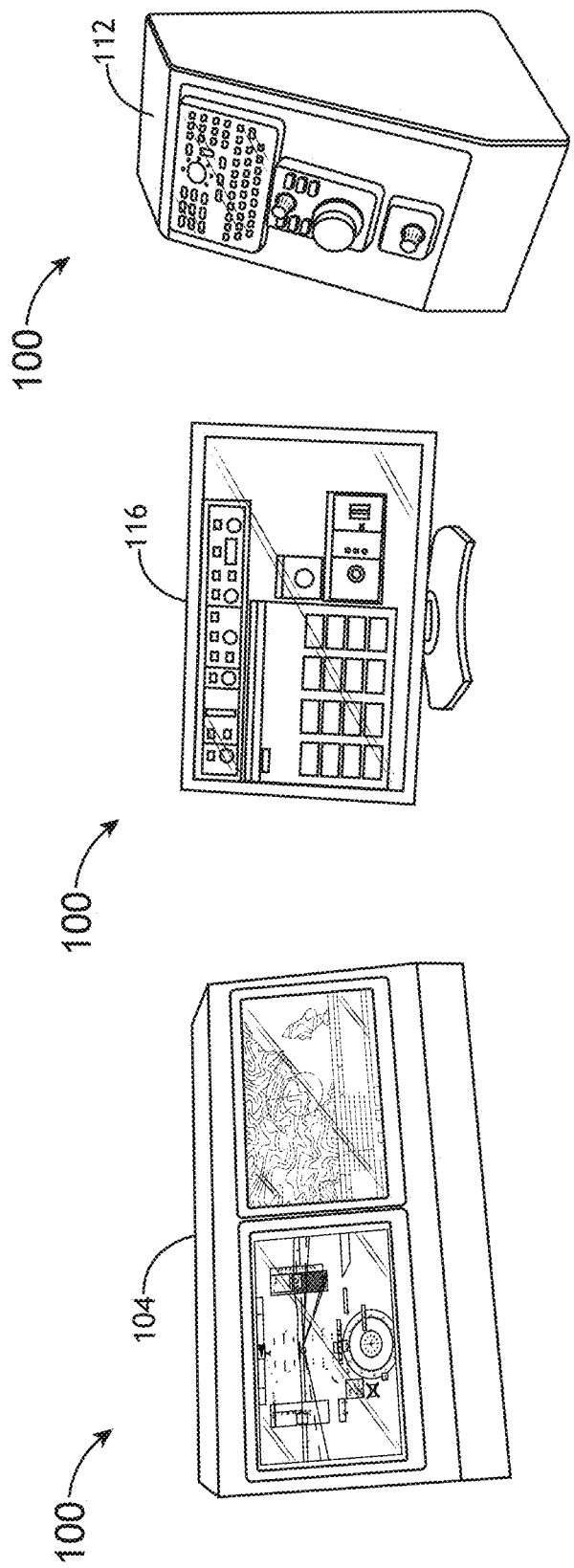
FIG. 1C illustrates an avionics lower level device simulator including advanced haptics in a touchscreen, in accordance with one or more embodiments of the disclosure.

FIGS. 1A-1C in general illustrate an avionics lower level device (LLD) simulator 100, in accordance with one or more embodiments of the disclosure.

The LLD simulator 100 may be configured in accordance with guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. For example, the LLD simulator 100 may be designed in accordance with guidelines and/or standards put forth in ARINC 610, *GUIDANCE FOR DESIGN AND INTEGRATION OF AIRCRAFT AVIONICS EQUIPMENT IN SIMULATORS*, as last published Feb. 1, 1992.

The LLD simulator 100 may include a main chassis or body 102. For example, the main chassis or body 102 may represent a flight deck of a cockpit. The LLD simulator 100 may include or be coupled to one or more instrument panel touchscreen display devices 104 coupled to the main chassis or body 102.

The LLD simulator 100 may include an upper chassis or body 106. The LLD simulator 100 may include or be coupled to one or more windshield or other line-of-sight touchscreen display devices 108 coupled to the upper chassis or body 106. For example, the one or more windshield or other line-of-sight touchscreen display devices 108 may be configured to display actual or emulated environmental conditions.

The LLD simulator 100 may include a center console 110. For example, the center console 110 may represent a pedestal of the cockpit. The LLD simulator 100 may include or be coupled to one or more primary flight control touchscreen display devices 112 coupled to the center console 110. For example, the one or more primary flight control touchscreen display devices 112 may include primary flight controls directly involved in flying an aircraft.

The LLD simulator 100 may include an overhead chassis or body 114. The LLD simulator 100 may include or be coupled to one or more secondary control touchscreen display devices 116. For example, the one or more secondary control touchscreen display devices 116 may include secondary aircraft controls not directly involved in flying an aircraft.

The LLD simulator 100 may include one or more side consoles 118. The LLD simulator 100 may include or be coupled to one or more side console touchscreen display devices 120. For example, the one or more side console touchscreen display devices 120 may include controls for communication instruments, documentation, or the like.

It is noted herein the main chassis or body 102, the upper chassis or body 106, the center console 110, the overhead chassis or body 114, and/or the one or more side consoles 118 may be considered cockpit sections emulated by or within a select arrangement or build of the LLD simulator 100, for purposes of the present disclosure.

Although embodiments of the disclosure illustrate separate cockpit sections 102, 106, 110, 114, 118, it is noted herein one or more of the cockpit sections 102, 106, 110, 114, 118 may be combined or integrated into a single component. Therefore, the above description should not be interpreted as a limitation on the disclosure but merely an illustration.

Although embodiments of the disclosure illustrate select touchscreen display devices 104, 108, 112, 116, 120 coupled to corresponding cockpit sections 102, 106, 110, 114, 118, it is noted herein the disclosure is not limited to the particular arrangement. For example, the select touchscreen display devices 104, 108, 112, 116, 120 coupled to different or multiples of the different cockpit sections 102, 106, 110, 114, 118. By way of another example, the LLD simulator 100 may be limited in the number of select touchscreen display devices 104, 108, 112, 116, 120 coupled to corresponding cockpit sections 102, 106, 110, 114, 118 (e.g., where the LLD simulator 100 is a table-top simulator such as a desktop computer build). Therefore, the above description should not be interpreted as a limitation on the disclosure but merely an illustration.

Although not illustrated, the LLD simulator 100 may include components (e.g., physical or imaged components) for a joystick, yoke, seat, headset, helmet, rudder pedals/brake pedals, footrests, or the like.

It is noted herein the LLD simulator 100 may be dimensioned for floor or platform installation or usage (e.g., as illustrated in FIG. 1A), such that the LLD simulator 100 may emulate a cockpit of an aircraft. In addition, is noted herein the LLD simulator 100 may be dimensioned for table-top installation or usage (e.g., as illustrated in FIGS. 1B and 1C).

FIGS. 2A-2F in general illustrate cross-sectional diagrams of a portion of a touchscreen display device 104 of the LLD simulator 100, in accordance with one or more embodiments of the disclosure. Although FIGS. 2A-2F and corresponding description illustrates the touchscreen display device 104, it is noted herein that FIGS. 2A-2F and any description corresponding to FIGS. 2A-2F may be directed to any of the touchscreen display devices 104, 108, 112, 116, 120 of the LLD simulator 100.

The touchscreen display device 104 may include, but is not limited to, a capacitive touchscreen display device such as, but not limited to, a Projected Capacitive Touch (PCT) touchscreen display device (e.g., a mutual capacitance PCT touchscreen display device, a self-capacitance PCT touchscreen display device, or the like). The touchscreen display device 104 may include, but is not limited to, a resistive touchscreen display device. The touchscreen display device 104 may include, but is not limited to, a beam interrupt touchscreen display device (e.g., such as an infrared grid touchscreen device). The touchscreen display device 104 may include, but is not limited to, an optical touchscreen display device. The touchscreen display device 104 may include, but is not limited to, a touchscreen display device configured to detect piezoelectricity in glass due to a touch.

The touchscreen display device 104 may include a display stack assembly 200. The display stack assembly 200 may include may include one or more touchscreen sensors 202. The one or more touchscreen sensors 202 may be configured to sense a touch or near touch (such as a finger or apparatus (e.g., a stylus or glove) in proximity to a user-interfaceable surface of the touchscreen display device 104) of the touchscreen display device 104. For example, where the touchscreen display device 104 is a capacitive touchscreen display device, the one or more touchscreen sensors 202 may include a transparent conductor layer (such as indium tin oxide (ITO)) deposited on an insulator substrate (such as glass), which results in a measurable change in capacitance when the surface of the one or more touchscreen sensors 202 is touched or nearly touched. By way of another example, where the touchscreen display device 104 is a beam interrupt touchscreen display device, the one or more touchscreen sensors 202 may include an array (e.g., an X-Y grid) of pairs of beam emitters (e.g., light emitting diodes (LEDs)) and sensors (e.g., photodetectors) configured to detect a disruption of a beam or beam pattern during the occurrence of a touch or near touch of the touchscreen display device 104. The one or more touchscreen sensors 202 may be configured to output data (e.g., touch location information as signals or a change in electrical properties) to a controller, a processor, or other computing device as described throughout the disclosure.

The display stack assembly 200 may include an adhesive layer 204. The display stack assembly 200 may include a display 206. The adhesive layer 204 may include a transparent adhesive positioned between the display 206 and the one or more touchscreen sensors 202. The adhesive layer 204 may bond the display 206 to a substrate of the one or more touchscreen sensors 202. In some embodiments, the adhesive layer 204 may be omitted. In some embodiments, another adhesive layer may bond a bottom surface of the display 206 to a rigid or substantially rigid substrate below the display 206.

The display 206 may be implemented as display element configured to impart an image for presentation to user. For example, the display 206 is implemented as a transmissive display element, an emissive display element, as well as other types of display elements. For instance, the display 206 may be transmissive display element implemented as a liquid crystal display (LCD) element. In addition, the display 206 may be implemented as an organic light-emitting diode (OLED) display element, such as active-matrix OLEDs (AMOLEDs), passive-matrix OLEDs (PMOLEDs), light-emitting electrochemical cells (LECs), or the like. Further, the display 206 may be implemented as an in-cell or on-cell LCD display element such that the LCD display element and the touchscreen sensor 202 are implemented in a single layer.

It is noted herein the display stack assembly 200 may include a rigid or substantially rigid substrate.

The touchscreen display device 104 may include a display bezel 208 The display stack assembly 200 may be positioned proximate to the display bezel 208. For example, the display bezel 208 may fully or partially surround an edge of the display stack assembly 200. For instance, the display bezel 208 may be positioned on top of the display stack assembly 200. In addition, the display bezel 208 may at least partially enclose (e.g., cover a portion of a side) of the display stack assembly 200.

The touchscreen display device 104 may include one or more force sensors 210 positioned proximate to the display stack assembly 200. The one or more force sensors 210 may be configured to detect an amount of force (e.g., compressive force) acting on (e.g., applied by a user when the user is touching a user-interfaceable surface of the touchscreen display device 104) on the force sensor 210. For example, the one or more force sensors 210 may be implemented as conductive polymer force sensors, piezoelectric force sensors, other suitable force sensors, or a combination of the above.

The one or more force sensors 210 may be configured to output data (e.g., touch force information as signals or a change in electrical properties) to a controller, a processor, or other computing device as described throughout the disclosure. The one or more force sensors 210 may be opaque, may be transparent, or may be a combination of opaque force sensors and transparent force sensors.

The one or more force sensors 210 may be positioned below the display 206 and along the edges of the display 206. It is noted herein, however, that the one or more force sensors 210 may be implemented in any of various suitable locations and/or configurations. For example, the one or more force sensors 210 may be positioned below, above, or within the display stack assembly 200. By way of another example, a single force sensor 210 may be implemented as a ring (e.g., rectangular ring) located below or above the display 206 and in proximity to the edges of the display 206. By way of another example, the one or more force sensors 210 may be implemented as strips, where each strip is located along an edge of the display 206. By way of another example, the one or more force sensors 210 may be arranged in an array (e.g., rows, columns, a grid of rows and columns, arranged in a pattern of concentric circles, or the like) of transparent force sensors arranged across (e.g., in a plane above, below, or within the display stack assembly 200) the display 206 (e.g. a transmissive display). Therefore, the above description should not be interpreted as a limitation on the disclosure but merely an illustration.

The touchscreen display device 104 may include a support structure 212. The display stack assembly 200 may be positioned proximate to the support structure 212. For example, the support structure 212 may include, but is not limited to, a support frame, such as a display stack support frame.

The touchscreen display device 104 may include a support plate 214 positioned proximate to the support structure 212. The display stack assembly 200 may be positioned proximate to the support plate 214.

The touchscreen display device 104 may include a backlight 216. The display stack assembly 200 may be positioned proximate to the backlight 216.

The touchscreen display device 104 may include one or more advanced haptic feedback components 218 positioned proximate to the display stack assembly 200. For example, the one or more advanced haptic feedback components 218 may include, but are not limited to, components fabricated from piezo ceramics, a piezo thin film, or other piezo actuation component.

The touchscreen display device 104 may include one or more other components such as, but not limited to, a cover transparent substrate, light control films, polarizing films, a gap, a diffuser, a housing, communicative coupling elements (e.g., wires, cables, connectors, etc.), connectivity ports, a power supply, a processor, a circuit board (e.g., printed circuit board (PCB)), a controller, memory, storage, an antenna, or the like. Some or all of the components of the touchscreen display device 104 may be communicatively coupled.

Figure 2A:
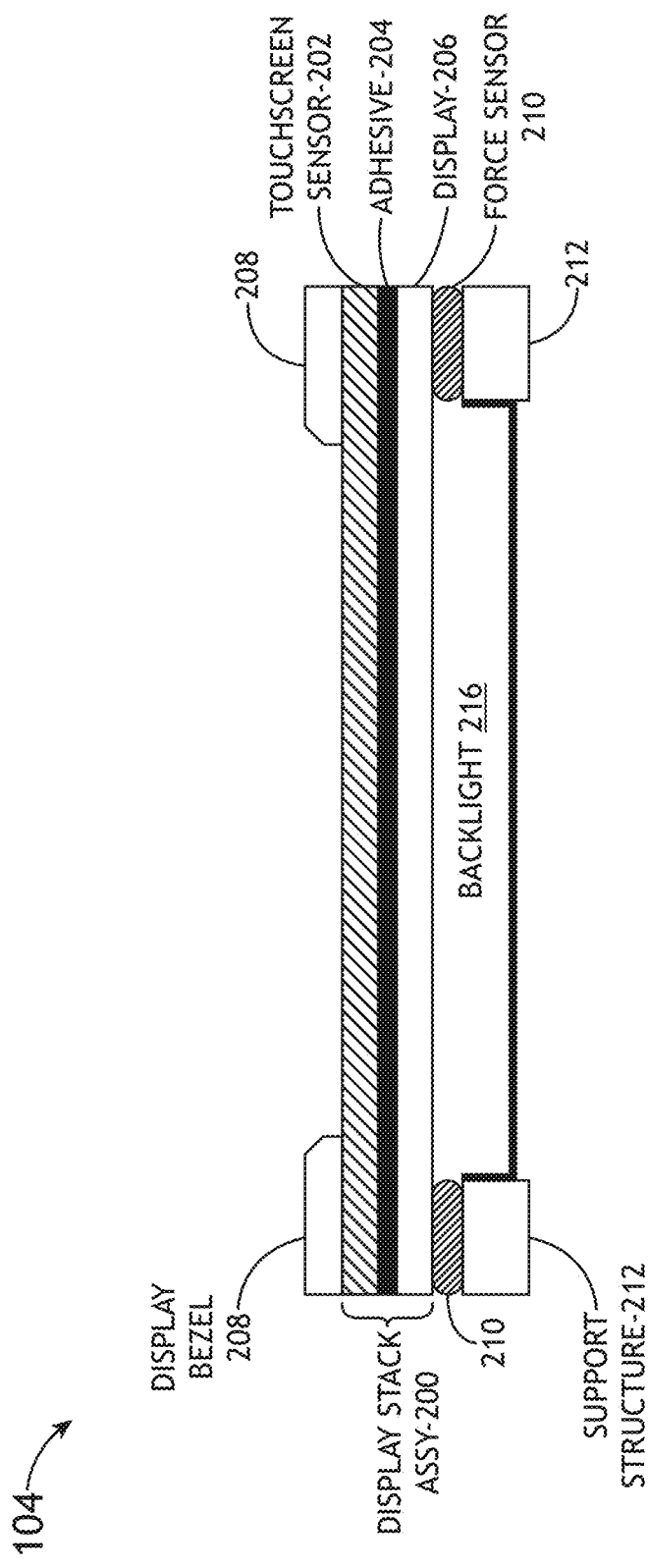
FIG. 2A illustrates a cross-sectional diagram of a portion of a touchscreen display device, in accordance with one or more embodiments of the disclosure.

As illustrated in FIG. 2A, the display stack assembly 200 may be positioned between a display bezel 208 and one or more force sensors 210. The display bezel 208 may be positioned above the display stack assembly 200. The display stack assembly 200 may be positioned between the display bezel 208, on the top side, and the one or more force sensors 210 and the backlight 216, on the bottom side. The one or more force sensors 210 may be positioned between the display stack assembly 200 and the support structure 212, and the one or more force sensors 210 are positioned under the edges of the display stack assembly 200. The backlight 216 may be positioned under the display stack assembly 200 and between the support structure 212. While FIG. 2A depicts one embodiment having an exemplary arrangement of components of the touchscreen display device 104, other embodiments may include any suitable arrangements of the same or other components.

Figure 2B:
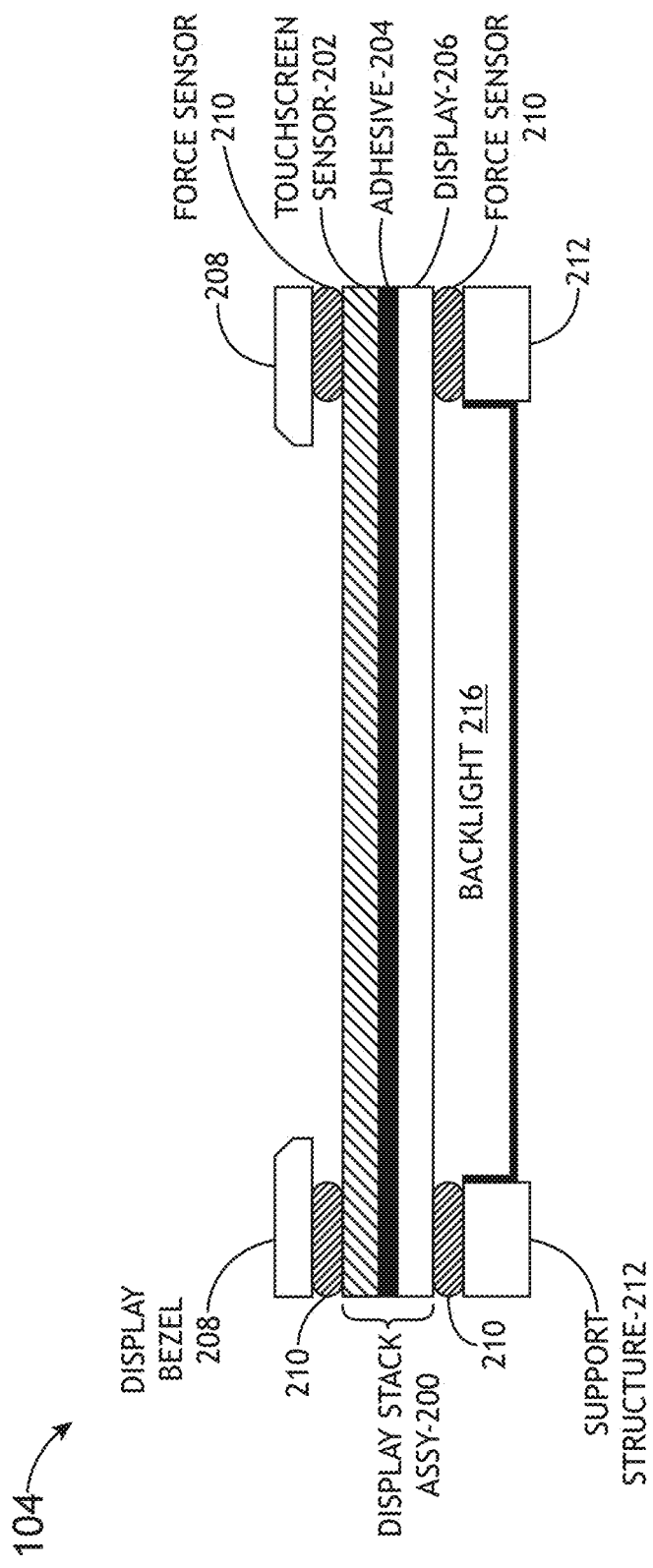
FIG. 2B illustrates a cross-sectional diagram of a portion of a touchscreen display device, in accordance with one or more embodiments of the disclosure.

As illustrated in FIG. 2B, the display bezel 208 may be positioned above one or more force sensors 210 and the display stack assembly 200. The one or more force sensors 210 may be positioned between the display bezel 208 and the display stack assembly 200 along the edges of the display stack assembly 200. The display stack assembly 200 may be positioned between the display bezel 208 and one or more force sensors 210, on the top side, and one or more additional force sensors 210 and the backlight 216, on the bottom side. The one or more additional force sensors 210 may be positioned between the display stack assembly 200 and the support structure 212, and the one or more additional force sensors 210 may be positioned under the edges of the display stack assembly 200. The backlight 216 may be positioned under the display stack assembly 200 and between the support structure 212. While FIG. 2B depicts one embodiment having an exemplary arrangement of components of the touchscreen display device 104, other embodiments may include any suitable arrangements of the same or other components.

Figure 2C:
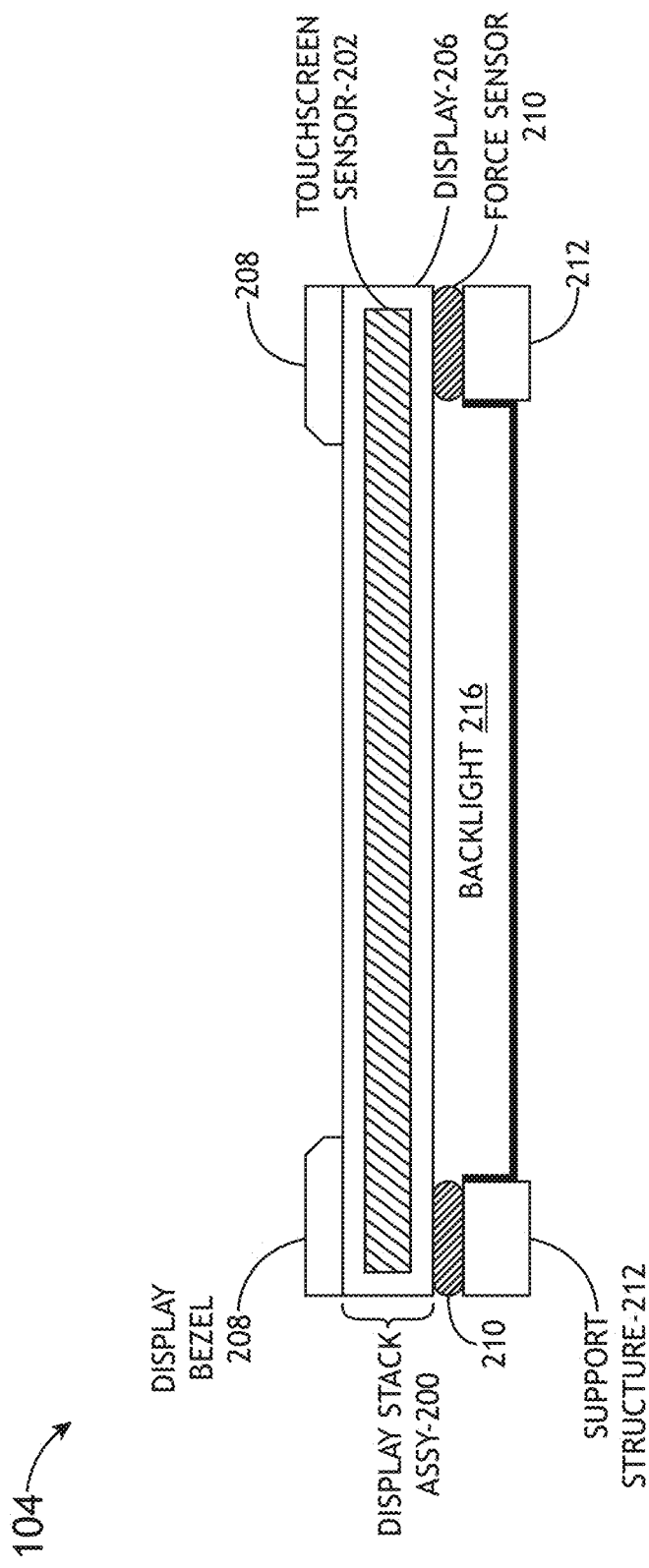
FIG. 2C illustrates a cross-sectional diagram of a portion of a touchscreen display device, in accordance with one or more embodiments of the disclosure.

As illustrated in FIG. 2C, the touchscreen sensor 202 may be implemented in the display 206 within the display stack assembly 200. For example, no adhesive layer 204 may be required where the touchscreen sensor 202 is implemented in the display 206. The display stack assembly 200 may be positioned between a display bezel 208 and one or more force sensors 210. The display bezel 208 may be positioned above the display stack assembly 200. The display stack assembly 200 may be positioned between the display bezel 208, on the top side, and the one or more force sensors 210 and the backlight 216, on the bottom side. The one or more force sensors 210 may be positioned between the display stack assembly 200 and the support structure 212, and the one or more force sensors 210 are positioned under the edges of the display stack assembly 200. The backlight 216 may be positioned under the display stack assembly 200 and between the support structure 212. While FIG. 2C depicts one embodiment having an exemplary arrangement of components of the touchscreen display device 104, other embodiments may include any suitable arrangements of the same or other components.

Figure 2D:
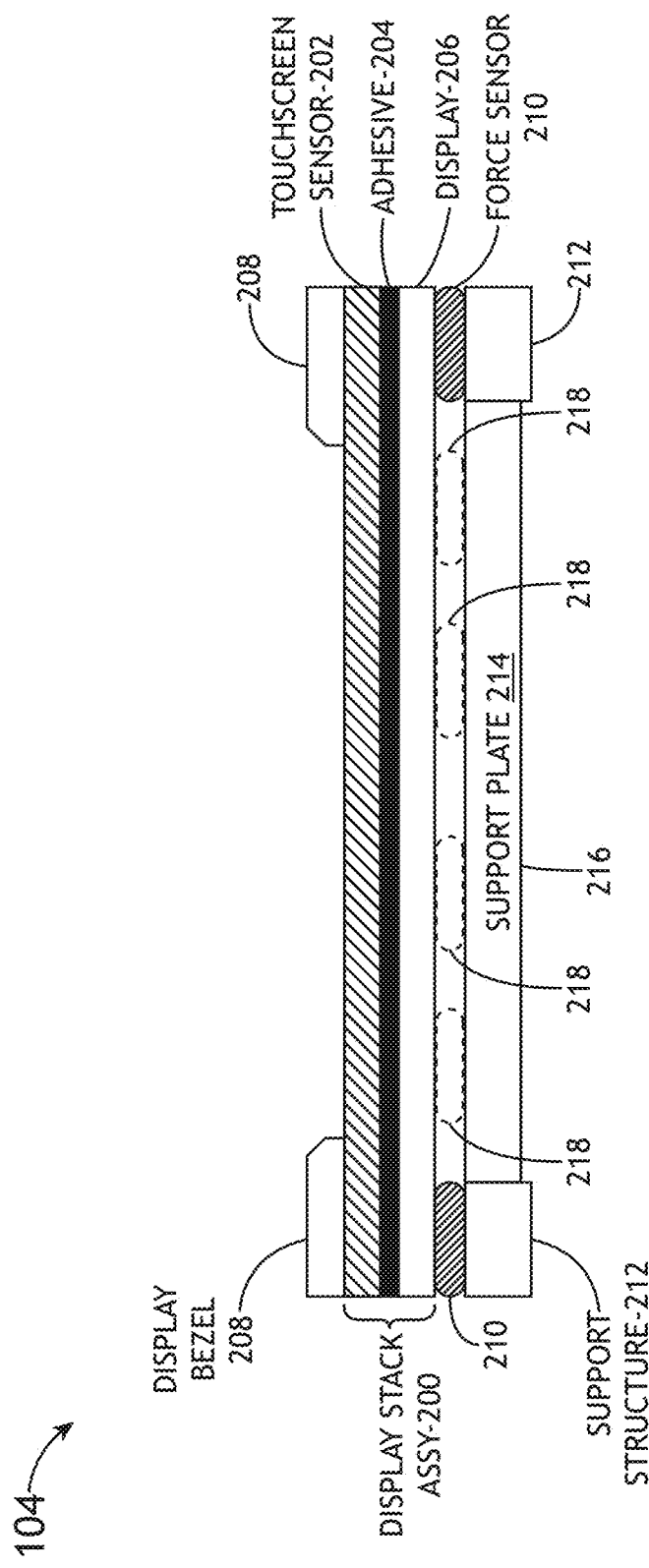
FIG. 2D illustrates a cross-sectional diagram of a portion of a touchscreen display device, in accordance with one or more embodiments of the disclosure.

As illustrated in FIG. 2D, the display bezel 208 may be positioned above the display stack assembly 200. The display stack assembly 200 may be positioned between the display bezel 208, on the top side, the one or more force sensors 210, and the one or more advanced haptic feedback components 218 on the bottom side. The one or more force sensors 210 may be positioned between the display stack assembly 200 and the support structure 212, and the one or more force sensors 210 are positioned under the edges of the display stack assembly 200. The one or more advanced haptic feedback components 218 may be positioned between the display stack assembly 200 and the support plate 214, and the one or more advanced haptic feedback components 218 may be generally positioned under the viewable portion of the display 206. The support plate 214 may be positioned under the one or more advanced haptic feedback components 218 and between the support structure 212. The backlight 216 may be positioned under the display stack assembly 200 and between the support structure 212. It is noted herein, however, that the backlight 216 may not be included in the embodiment illustrated in FIG. 2D. While FIG. 2D depicts one embodiment having an exemplary arrangement of components of the touchscreen display device 104, other embodiments may include any suitable arrangements of the same or other components.

Figure 2E:
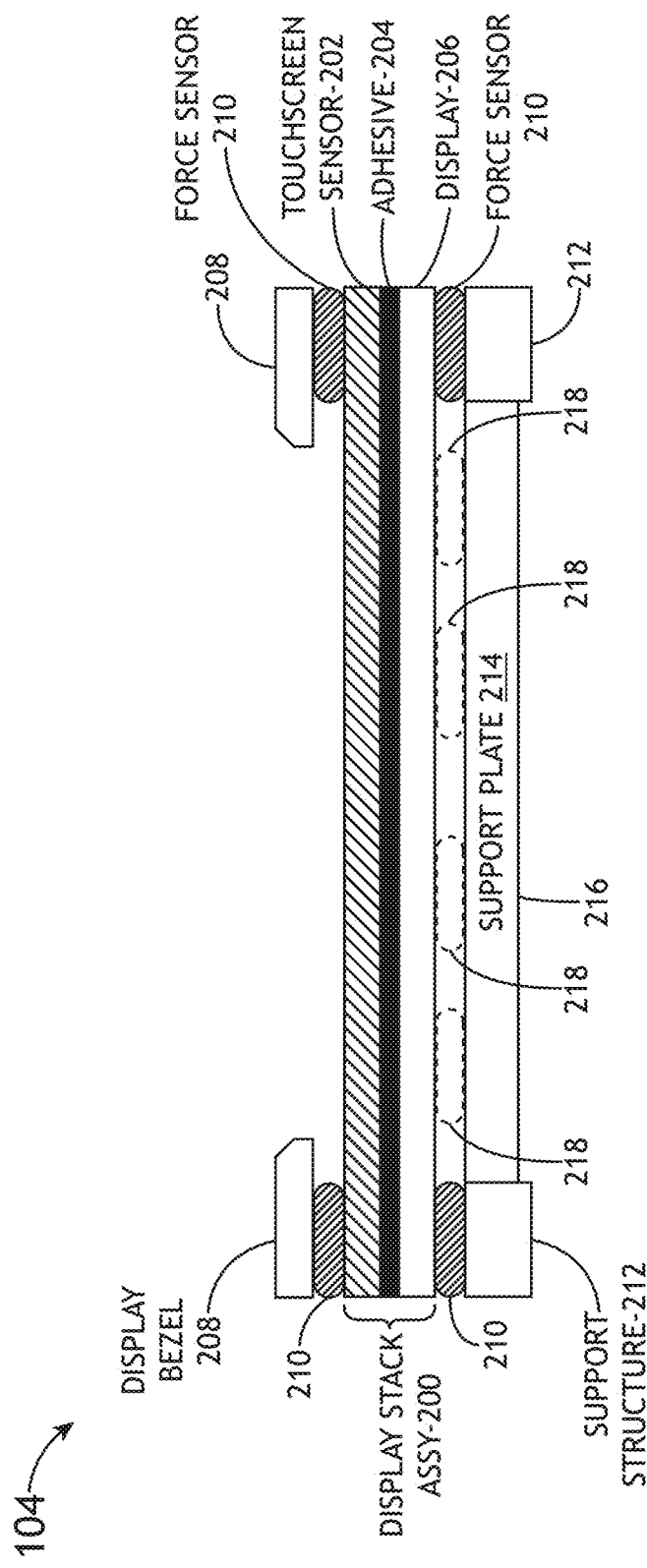
FIG. 2E illustrates a cross-sectional diagram of a portion of a touchscreen display device, in accordance with one or more embodiments of the disclosure.

As illustrated in FIG. 2E, the display bezel 208 may be positioned above the one or more force sensors 210 and the display stack assembly 200. The one or more force sensors 210 may be positioned between the display bezel 208 and the display stack assembly 200 along the edges of the display stack assembly 200. The display stack assembly 200 may be positioned between the display bezel 208 and the one or more force sensors 210, on the top side, the one or more additional force sensors 210, and the one or more advanced haptic feedback components 218 on the bottom side. The one or more additional force sensors 210 may be positioned between the display stack assembly 200 and the support structure 212, and the one or more additional force sensors 210 may be positioned under the edges of the display stack assembly 200. The one or more advanced haptic feedback components 218 may be positioned between the display stack assembly 200 and the support plate 214, and the one or more advanced haptic feedback components 218 may be generally positioned under the viewable portion of the display 206. The support plate 214 may be positioned under the one or more advanced haptic feedback components 218 and between the support structure 212. The backlight 216 may be positioned under the display stack assembly 200 and between the support structure 212. It is noted herein, however, that the backlight 216 may not be included in the embodiment illustrated in FIG. 2E. While FIG. 2E depicts one embodiment having an exemplary arrangement of components of the touchscreen display device 104, other embodiments may include any suitable arrangements of the same or other components.

Figure 2F:
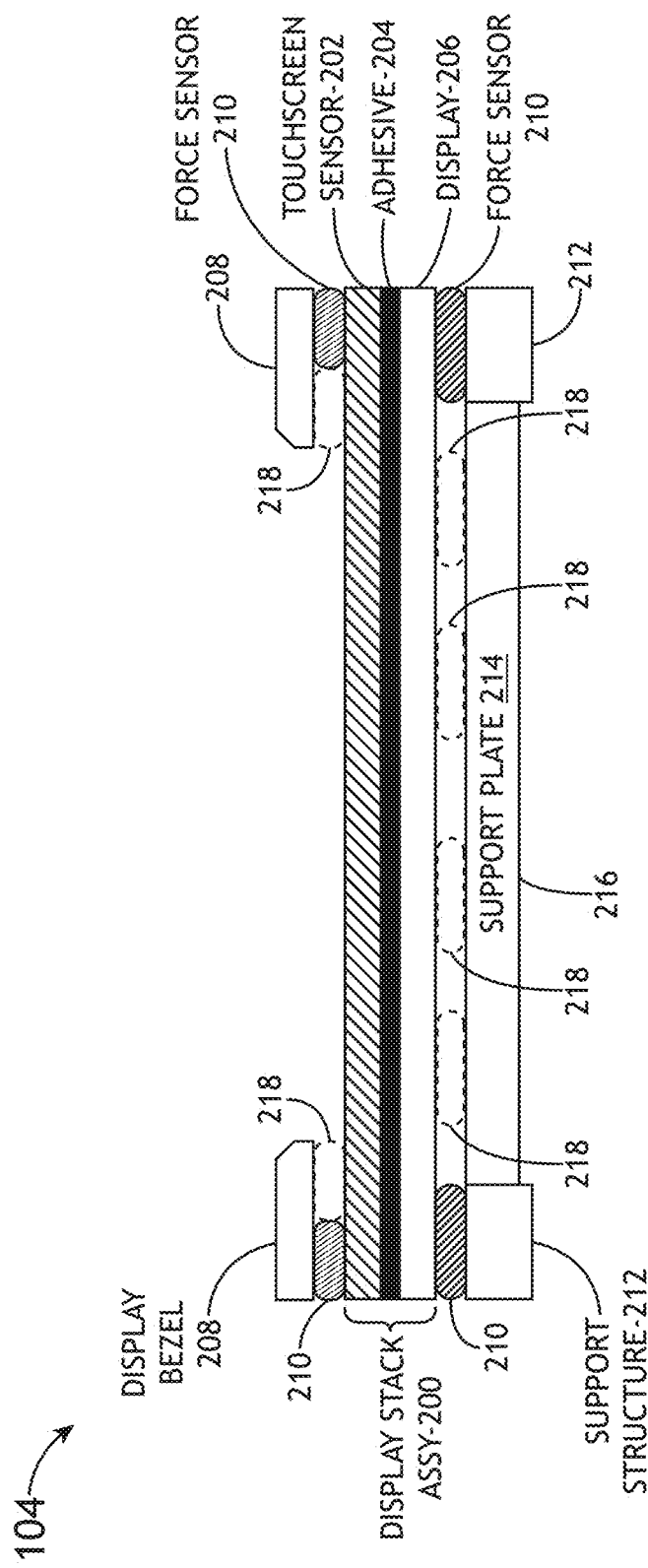
FIG. 2F illustrates a cross-sectional diagram of a portion of a touchscreen display device, in accordance with one or more embodiments of the disclosure.

As illustrated in FIG. 2F, the display bezel 208 may be positioned above the one or more force sensors 210, the one or more advanced haptic feedback components 218, and the display stack assembly 200. The one or more force sensors 210 and the one or more advanced haptic feedback components 218 may be positioned between the display bezel 208 and the display stack assembly 200 along the edges of the display stack assembly 200. The display stack assembly 200 may be positioned between the display bezel 208, the one or more force sensors 210, and the one or more advanced haptic feedback components 218, on the top side, the one or more additional force sensors 210, and one or more additional advanced haptic feedback components 218 on the bottom side. The one or more additional force sensors 210 may be positioned between the display stack assembly 200 and the support structure 212, and the one or more additional force sensors 210 may be positioned under the edges of the display stack assembly 200. The one or more advanced haptic feedback components 218 may be positioned between the display stack assembly 200 and the support plate 214, and the one or more advanced haptic feedback components 218 may be generally positioned under the viewable portion of the display 206. The support plate 214 may be positioned under the one or more advanced haptic feedback components 218 and between the support structure 212. The backlight 216 may be positioned under the display stack assembly 200 and between the support structure 212. It is noted herein, however, that the backlight 216 may not be included in the embodiment illustrated in FIG. 2F. While FIG. 2F depicts one embodiment having an exemplary arrangement of components of the touchscreen display device 104, other embodiments may include any suitable arrangements of the same or other components.

Figure 3:
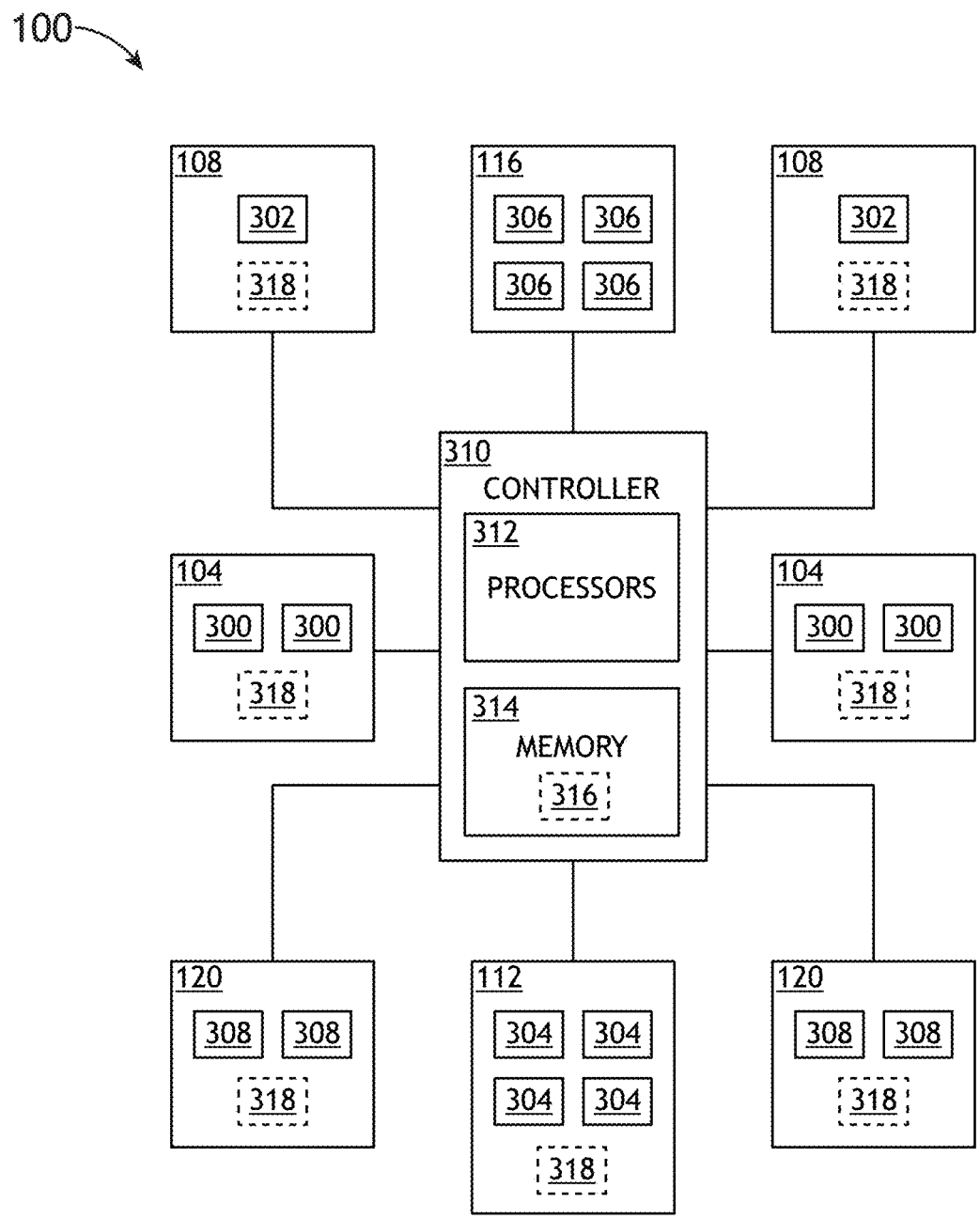
FIG. 3 illustrates a block diagram of a avionics lower level device simulator including advanced haptics in a touchscreen, in accordance with one or more embodiments of the disclosure.
Figure 4:
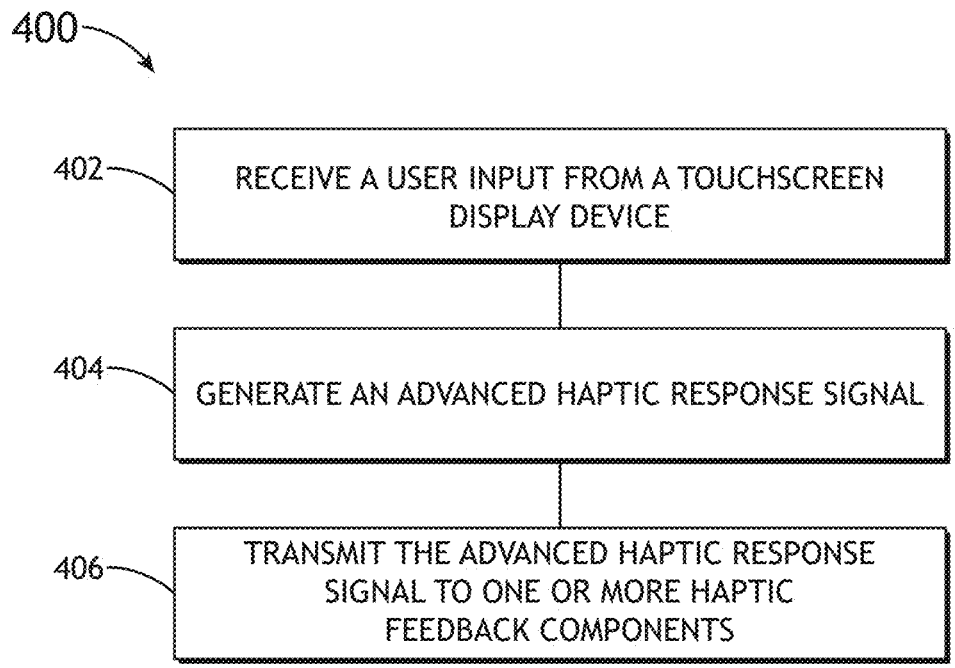
FIG. 4 is a flow diagram illustrating a method or process for generating advanced haptics in touchscreen avionics lower level device simulators, in accordance with one or more embodiments of the disclosure.
Figure 5:
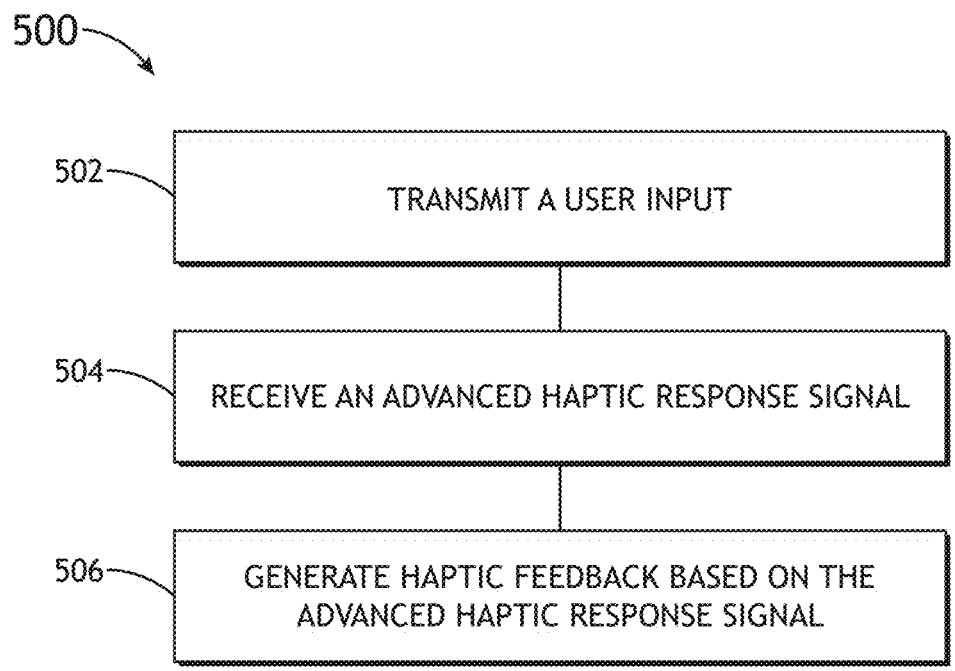
FIG. 5 is a flow diagram illustrating a method or process for generating advanced haptics in touchscreen avionics lower level device simulators, in accordance with one or more embodiments of the disclosure.

FIG. 3 illustrates the avionics LLD simulator 100, in accordance with one or more embodiments of the disclosure. FIGS. 4 and 5 in general illustrate methods or processes for generating advanced haptics in touchscreen avionics lower level device simulators, in accordance with one or more embodiments of the disclosure.

It is noted herein the embodiments illustrated in FIGS. 2A-2F with respect to the touchscreen display device 104 should be understood to be applicable to the touchscreen display devices 104, 108, 112, 116, 120 illustrated in FIG. 3. For example, it should be understood the touchscreen display devices 104, 108, 112, 116, 120 as illustrated in FIG. 3 may include one or more of the display stack assembly 200 with the one or more touchscreen sensors 202, the adhesive layer 204, and/or the display 206, the display bezel 208, the one or more force sensors 210, the one or more support structures 212, the support plate 214, the backlight 216, and/or the one or more advanced haptic feedback components 218.

In general, the touchscreen display devices 104, 108, 112, 116, 120 may be configured to display one or more graphical user interfaces (GUIs) and/or GUI icons related to an operation of one or more internal components or external components on an aircraft. For example, the touchscreen display devices 104, 108, 112, 116, 120 may be generally configured to display electronic maps, aircraft performance parameters, aircraft performance parameter predictions, sensor readings, aircraft data, flight data, communications, alerts, and the like.

In general, the touchscreen display devices 104, 108, 112, 116, 120 may include, but are not limited to, one or more primary flight display devices and/or one or more multi-function display devices that are viewable by a user. It is noted herein, however, that the LLD simulator 100 may include any number of touchscreen display devices 104, 108, 112, 116, 120 (e.g., one, two, three, or more touchscreen display devices 104, 108, 112, 116, 120) including one or more primary flight display devices, secondary flight display devices, and/or multi-function display devices.

The one or more instrument panel touchscreen display devices 104 may be configured to display one or more GUIs and/or GUI icons related to or representing one or more aircraft instruments 300. For example, the one or more aircraft instruments 300 may include, but are not limited to, a primary flight display, a secondary flight display, a multi-function flight display, an airspace indicator, an altitude indicator, an artificial horizon indicator, a direction finder (e.g., directional gyroscope), a turn and/or tilt indicator, a vertical velocity indicator, a bank of navigation controls, a systems information display, marker beacons, an automatic direction finder (ADF), a distance measurement equipment (DME), a transponder, a radar display, a Global Positioning System (GPS), or the like.

The one or more windshield or other line-of-sight touchscreen display devices 108 may be configured to display one or more GUIs and/or GUI icons related to or representing actual or emulated environmental conditions 302. For example, the one or more environmental conditions 302 may include, but are not limited to, a runway, a hanger, an obstacle, sky, water, land, or the like.

The one or more center console touchscreen display devices 112 may be configured to display one or more GUIs and/or GUI icons related to or representing one or more primary aircraft controls 304. For example, the one or more primary aircraft controls 304 may include, but are not limited to, engine and navigation controls 304 coupled to the center console 110. For instance, the primary aircraft controls 304 may include, but are not limited to, throttle levers, user input devices (e.g., keyboards, or the like) for various navigational systems displayed on the one or more instrument panels touchscreen display devices 104 and/or various communication systems displayed on the one or more side console touchscreen display devices 120, or the like.

The one or more secondary control touchscreen display devices 116 may be configured to display one or more GUIs and/or GUI icons related to or representing one or more secondary aircraft controls 306. For example, the one or more secondary aircraft controls 306 may include, but are not limited to, anti-ice controls, air conditioning controls, cabin pressurization controls, oxygen controls, or the like.

The one or more side console touchscreen display devices 120 may be configured to display one or more GUIs and/or GUI icons related to or representing one or more side console aircraft controls or documentation 308. For example, the one or more side console aircraft controls 308 may include, but not limited to, communication instrument controls, documentation, or the like.

The LLD simulator 100 may be configured to generate one or more advanced haptic feedback responses via the touchscreen display devices 104, 108, 112, 116, 120 coupled to corresponding cockpit sections 102, 106, 110, 114, 118. For example, the one or more feedback responses may include one or more advanced haptic feedback responses (e.g., an advanced tactile response and/or an advanced kinesthetic response). By way of another example, the one or more feedback responses may include one or more visual feedback responses (e.g., one or more lights). By way of another example, the one or more feedback responses may include one or more auditory feedback responses (e.g., one or more sounds). By way of another example, the one or more feedback responses may include one or more graphical feedback responses (e.g., one or more displayed icons). It is noted herein the LLD simulator 100 may be configured to generate one or more feedback response of multiple types (e.g., advanced haptic feedback responses and visual feedback responses, or any other combination).

In an example embodiment, interaction with the one or more GUIs and/or GUI icons related to the controls 300, 302, 304, 306, 308 may be configured to provide a user with one or more advanced haptic responses. The one or more advanced haptic responses may be feedback beyond a simple vibration. The one or more advanced haptic responses may be specific to and/or otherwise dependent on the input received via the touchscreen display devices 104, 108, 112, 116, 120 following an interaction of the touchscreen display devices 104, 108, 112, 116, 120 by a user, such that different inputs received may result in different advanced haptic responses. For example, the advanced haptic responses may be defined by one or more metrics including, but not limited to, a pattern, a relief or texture, a wavelength, a rate of flash, a duration, intensity, elasticity, or other metric that defines an operation of a mechanical component. For instance, the one or more metrics may be constant or variable. In addition, the one or more metrics may be pre-set (e.g., stored within program instructions of one or more controllers installed in or coupled to the one or more LLD simulator 100) or may be adjustable. In this regard, the one or more advanced haptic responses may be a more efficient indication of successful interaction with the touchscreen display devices 104, 108, 112, 116, 120 by the user (e.g., than may be possible via a binary on/off pairing for any type of relayed information such as a call-and-response vibration).

For example, the advanced haptic responses may provide an advanced mimicry of a button resistance (e.g., as might be generated by a membrane or spring) when transitioning to a depressed state, and a return of the button to an original state upon release.

By way of another example, the advanced haptic responses may provide an advanced mimicry of a toggle switch snap, which may represent a resistance of a toggle switch between a first state and an intermediate transition point and a reduced resistance of the toggle switch between the intermediate transition point and a second state.

By way of another example, the advanced haptic responses may provide an advanced mimicry of a knob click, which may represent a resistance of a knob between a first state between a first state and an intermediate transition point and a reduced resistance of the knob between the intermediate transition point and a second state.

It is noted herein the touchscreen display devices 104, 108, 112, 116, 120 with the advanced haptic feedback components 218 may be configured for multi-touch. Where multi-touch is enabled, the advanced haptic responses may be local (e.g., at the location of the controls 300, 302, 304, 306, 308) such that each advanced haptic response may be separate and distinct from other advanced haptic responses with respect to the one or more above-defined metrics. In addition or in the alternative, the advanced haptic responses may be partially or fully global across the entire respective touchscreen display device 104, 108, 112, 116, 120 such that the advanced haptic responses may be similar with respect to the one or more above-defined metrics.

In this regard, the advanced haptic responses may provide a user using the LLD simulator 100 with a more advanced haptic response to their interactions with the one or more GUIs and/or GUI icons related to the controls 300, 302, 304, 306, 308 on the touchscreen display device 104, 108, 112, 116, 120 of the LLD simulator 100 during one or more training procedures beyond a simple vibration. The advanced haptic responses may allow for the LLD simulator 100 to be constructed with the touchscreen display devices 104, 108, 112, 116, 120 instead of mechanical components while still providing an advanced haptic feedback similar to that provided by mechanical components, leading a reduced cost and/or size of footprint of the LLD simulator 100 as compared to a full-flight or high-level simulator.

Interacting with the displayed GUIs and/or GUI icons related to the controls 300, 302, 304, 306, 308 may cause changes in the displayed GUIs and/or GUI icons on the respective touchscreen display devices 104, 108, 112, 116, 120. For example, interacting with the one or more instruments 300 displayed on the one or more instrument panel touchscreen display devices 104 may cause a change in what is being displayed for the one or more instruments 300 on the one or more instrument panel touchscreen display devices 104.

Interacting with the displayed GUIs and/or GUI icons related to the controls 300, 302, 304, 306, 308 may cause changes in the displayed GUIs and/or GUI icons on different touchscreen display devices 104, 108, 112, 116, 120. For example, interacting with a primary aircraft control 304 (e.g., a keyboard, or the like) displayed on the one or more center console touchscreen display devices 112 may cause a change in what is being displayed for the one or more instruments 300 on the one or more instrument panel touchscreen display devices 104.

FIG. 4 illustrates a method or process 400 for generating advanced haptics in touchscreen avionics lower level device simulators, in accordance with one or more embodiments of the disclosure.

In a step 402, a user input may be received from a touchscreen display device. The user input may be received from the touchscreen display devices 104, 108, 112, 116, and/or 120 installed on an LLD simulator 100. For example, the user input may be with respect to the controls 300, 302, 304, 306, and/or 308 displayed on the touchscreen display devices 104, 108, 112, 116, and/or 120, where the controls 300, 302, 304, 306, and/or 308 are related to a simulated function or operation of an aircraft.

In a step 404, an advanced haptic response signal may be generated. The advanced haptic response signal may be configured to cause an advanced haptic feedback mimicking a physical response observed following an operation of mechanical components installed within a cockpit of an aircraft, the mechanical components being related to the controls 300, 302, 304, 306, and/or 308 displayed on the touchscreen display devices 104, 108, 112, 116, and/or 120. For instance, the advanced haptic response signal may generate an advanced haptic response defined by one or more metrics of a physical response observed following an operation of mechanical components.

In a step 406, the advanced haptic response signal may be transmitted to one or more advanced haptic feedback components. The one or more advanced haptic feedback components 218 may be installed in the same touchscreen display device 104, 108, 112, 116, and/or 120 on which the interacted-with controls 300, 302, 304, 306, and/or 308 are displayed. The one or more advanced haptic feedback components 218 may be installed in different touchscreen display devices 104, 108, 112, 116, and/or 120 from the touchscreen display devices 104, 108, 112, 116, and/or 120 on which the interacted-with controls 300, 302, 304, 306, and/or 308 are displayed.

FIG. 5 illustrates a method or process 500 for generating advanced haptics in touchscreen avionics lower level device simulators, in accordance with one or more embodiments of the disclosure.

In a step 502, a user input may be transmitted. The user input may be transmitted to one or more controllers installed in an LLD simulator 100, either directly or within one or more touchscreen display devices 104, 108, 112, 116, and/or 120 installed on the LLD simulator 100.

In a step 504, an advanced haptic response signal may be received. The advanced haptic response signal may be configured to cause an advanced haptic feedback mimicking the operation of mechanical components related to the controls 300, 302, 304, 306, and/or 308 displayed on the touchscreen display devices 104, 108, 112, 116, and/or 120. For instance, the advanced haptic response signal may generate an advanced haptic response defined by one or more metrics that mimic an operation of a mechanical component within the one or more advanced haptic feedback components 218.

In a step 506, advanced haptic feedback may be generated based on the advanced haptic response signal. The one or more advanced haptic feedback components 218 may be installed in the same touchscreen display device 104, 108, 112, 116, and/or 120 on which the interacted-with controls 300, 302, 304, 306, and/or 308 are displayed. The one or more advanced haptic feedback components 218 may be installed in different touchscreen display devices 104, 108, 112, 116, and/or 120 from the touchscreen display devices 104, 108, 112, 116, and/or 120 on which the interacted-with controls 300, 302, 304, 306, and/or 308 are displayed.

It is noted herein the methods or processes 400 or 500 are not limited to the steps and/or sub-steps provided. The methods or processes 400 or 500 may include more or fewer steps and/or sub-steps. The methods or processes 400 or 500 may perform the steps and/or sub-steps simultaneously. The methods or processes 400 or 500 may perform the steps and/or sub-steps sequentially, including in the order provided or an order other than provided. Therefore, the above description should not be interpreted as a limitation on the scope of the disclosure but merely an illustration.

Referring again to FIG. 3, the LLD simulator 100 may include one or more controllers 310. The one or more controllers 310 may include one or more processors 312 and memory 314. The memory 314 may store one or more sets of program instructions. The one or more processors 312 may be configured to execute the one or more sets of program instructions to carry out one or more of the various steps described throughout the disclosure.

The one or more controllers 310 may include one or more communication interfaces. For example, the one or more communication interfaces may include via wired means or via wireless means (e.g., via Bluetooth, Wi-Fi, Near Field Communication (NFC), or the like), where the one or more communication interfaces may be configured to receive data, transmit data, transmit power, or otherwise interact with the other controllers in the LLD simulator 100.

The LLD simulator 100 may include one or more touchscreen display device controllers 318. The one or more touchscreen display device controllers 318 may include one or more processors and memory. The memory may store one or more sets of program instructions. The one or more processors may be configured to execute the one or more sets of program instructions to carry out one or more of the various steps described throughout the disclosure. The one or more controllers 310 may include one or more communication interfaces.

The one or more controllers 310 may be coupled (e.g., physically, electrically, and/or communicatively coupled) to the one or more touchscreen display device controllers 318. The one or more controllers 310 may transmit power, control signals, data, or the like (e.g., one or more signals) to the one or more touchscreen display device controllers 318. The one or more controllers 310 may receive power, control signals, data, or the like (e.g., the one or more signals) from the one or more components in the one or more touchscreen display device controllers 318.

The one or more processors 312 may include any one or more processing elements known in the art. In this sense, the one or more processors 312 may include any microprocessor device configured to execute algorithms and/or program instructions. In general, the term "processor" may be broadly defined to encompass any device having one or more processing elements, which execute a set of program instructions from a non-transitory memory medium (e.g., the memory 314), where the one or more sets of program instructions are configured to cause the one or more processors 312 to carry out any of one or more process steps.

The memory 314 may include any storage medium known in the art suitable for storing the one or more sets of program instructions executable by the associated one or more processors 312. For example, the memory 314 may include a non-transitory memory medium. For instance, the memory 314 may include, but is not limited to, a read-only memory (ROM), a random access memory (RAM), a magnetic or optical memory device (e.g., disk), a magnetic tape, a solid state drive, and the like. The memory 314 may be configured to provide display information to the one or more touchscreen display devices 104, 108, 112, 116, 120. In addition, the memory 314 may be configured to store user input information from one or more user input devices. The memory 314 may be housed in a common controller housing with the one or more processors 312. The memory 314 may, alternatively or in addition, be located remotely with respect to the spatial location of the processors 312, the one or more controllers 310 and/or the one or more touchscreen display device controllers. For instance, the one or more processors 312, the one or more controllers 310, and/or the one or more touchscreen display device controllers may access a remote memory 314 (e.g., server), accessible through a network (e.g., internet, intranet, and the like) via one or more communication interfaces.

The one or more communication interfaces may be operatively configured to communicate with one or more components of the one or more controllers 310 and/or the one or more components of the one or more touchscreen display device controllers. For example, the one or more communication interfaces may also be coupled (e.g., physically, electrically, and/or communicatively) with the one or more processors 312 to facilitate data transfer between components of the one or more components of the one or more controllers 310 and/or the one or more components of the one or more touchscreen display device controllers and the one or more processors 312. For instance, the one or more communication interfaces may be configured to retrieve data from the one or more processors 312, or other devices, transmit data for storage in the memory 314, retrieve data from storage in the memory 314, or the like. By way of another example, the one or more touchscreen display device controllers and/or one or more offboard controllers may be configured to receive and/or acquire data or information from other systems or tools by a transmission medium that may include wireline and/or wireless portions. By way of another example, the one or more touchscreen display device controllers and/or the one or more offboard controllers may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the one or more touchscreen display device controllers and/or the one or more offboard controllers and the other subsystems (e.g., of the aircraft 302). In addition, the one or more touchscreen display device controllers and/or the one or more offboard controllers may be configured to send data to external systems via a transmission medium (e.g., network connection).

Although the disclosure is directed to the one or more controllers 310 and the one or more touchscreen display device controllers being separate, it is noted herein the one or more controllers 310 and the one or more touchscreen display device controllers may be the same and/or share select components. Therefore, the above description should not be interpreted as a limitation on the disclosure but merely an illustration.

Although the disclosure is directed to the touchscreen display devices 104, 108, 112, 116, 120 including the one or more touchscreen display device controllers 318, it is noted herein, however, that the one or more touchscreen display device controllers 318 may be not present, and that the one or more controllers 310 may have direct control over the touchscreen display devices 104, 108, 112, 116, 120 and/or components of the touchscreen display devices 104, 108, 112, 116, 120.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An avionics lower level device (LLD) simulator, comprising:
    at least one touchscreen display device, the at least one touchscreen display device comprising:
        a display stack assembly including at least one touchscreen sensor and a display;
        at least one advanced haptic feedback component positioned proximate to the display stack assembly; and
        at least one force sensor positioned proximate to the at least one advanced haptic feedback component and being configured to sense a compressive force,
    the at least one advanced haptic feedback component and the at least one force sensor positioned between a display bezel of the at least one touchscreen display device and the display stack assembly,
    the at least one touchscreen display device configured to display at least one GUI or GUI icon, the at least one GUI or GUI icon related to an operation of an aircraft,
    the at least one advanced haptic feedback component configured to provide at least one advanced haptic feedback response following an interaction with the at least one GUI or GUI icon displayed on the at least one touchscreen display device, the advanced haptic feedback response being at least one of an advanced tactile response or an advanced kinesthetic response,
    the at least one advanced haptic feedback response configured to mimic a physical response observed following an operation of a mechanical component installed within a cockpit of the aircraft.

2. The avionics LLD simulator of claim 1, the at least one touchscreen display device further comprising:
    one or more of a backlight, a support structure, or a support plate, the display stack assembly positioned proximate to the one or more of the backlight, the support structure, or the support plate.

3. The avionics LLD simulator of claim 1, the at least one touchscreen display device including an instrument panel touchscreen display device configured to display at least one GUI or GUI icon representing an aircraft instrument.

4. The avionics LLD simulator of claim 1, the at least one touchscreen display device including a windshield touchscreen display device configured to display at least one GUI or GUI icon representing an actual or emulated environmental condition.

5. The avionics LLD simulator of claim 1, the at least one touchscreen display device including a primary flight control touchscreen display device configured to display at least one GUI or GUI icon representing a primary flight control.

6. The avionics LLD simulator of claim 1, the at least one touchscreen display device including a secondary control touchscreen display device configured to display at least one GUI or GUI icon representing a secondary aircraft control.

7. The avionics LLD simulator of claim 1, the at least one touchscreen display device including a side console touchscreen display device configured to display at least one GUI or GUI icon representing a side console aircraft control.

8. The avionics LLD simulator of claim 1, the mechanical component including a button, knob, switch, or lever installed in the cockpit of the aircraft.

9. An avionics lower level device (LLD) simulator, comprising:
    at least one cockpit section; and
    at least one touchscreen display device coupled to the at least one cockpit section, the at least one touchscreen display device comprising:
        a display stack assembly including at least one touchscreen sensor and a display;
        at least one advanced haptic feedback component positioned proximate to the display stack assembly and being configured to sense a compressive force; and
        at least one force sensor positioned proximate to the at least one advanced haptic feedback component,
    the at least one advanced haptic feedback component and the at least one force sensor positioned between a display bezel of the at least one touchscreen display device and the display stack assembly,
    the at least one touchscreen display device configured to display at least one GUI or GUI icon, the at least one GUI or GUI icon related to an operation of an aircraft,
    the at least one advanced haptic feedback component configured to provide at least one advanced haptic feedback response following an interaction with the at least one GUI or GUI icon displayed on the at least one touchscreen display device, the advanced haptic feedback response being at least one of an advanced tactile response or an advanced kinesthetic response,
    the at least one advanced haptic feedback response configured to mimic an operation of a mechanical component installed within a cockpit of the aircraft.

10. The avionics LLD simulator of claim 9, the at least one cockpit section including at least one of a main chassis, an upper chassis, a center console, an overhead chassis, or a side console.

\* \* \* \* \*